(12) United States Patent
Ono et al.

(10) Patent No.: US 7,711,819 B2
(45) Date of Patent: May 4, 2010

(54) LOAD BALANCER

(75) Inventors: Hideaki Ono, Kawasaki (JP); Ryuichi Takechi, Kawasaki (JP); Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 649 days.

(21) Appl. No.: 10/087,095

(22) Filed: Mar. 1, 2002

(65) Prior Publication Data

US 2003/0093560 A1    May 15, 2003

(30) Foreign Application Priority Data

Oct. 31, 2001    (JP) .............................. 2001-335480

(51) Int. Cl.
*G06F 15/173* (2006.01)
(52) U.S. Cl. .................... 709/226; 709/244; 709/228
(58) Field of Classification Search ................. 709/245, 709/241, 238–239, 226–228; 455/435.1
See application file for complete search history.

(56) References Cited

U.S. PATENT DOCUMENTS

| | | | |
|---|---|---|---|
| 6,865,611 B1* | 3/2005 | Bragg ......................... | 709/238 |
| 6,952,425 B1* | 10/2005 | Nelson ........................ | 370/429 |
| 2001/0012777 A1* | 8/2001 | Igarashi et al. ............... | 455/435 |
| 2001/0016492 A1* | 8/2001 | Igarashi et al. ............... | 455/433 |
| 2003/0058855 A1 | 3/2003 | Feyerabend et al. | |
| 2003/0074467 A1* | 4/2003 | Oblak et al. ................. | 709/238 |
| 2003/0115328 A1* | 6/2003 | Salminen et al. ............. | 709/225 |
| 2003/0208601 A1* | 11/2003 | Campbell et al. ........... | 709/227 |
| 2003/0217145 A1* | 11/2003 | Leung et al. ................. | 709/224 |
| 2003/0224792 A1* | 12/2003 | Verma et al. ................. | 455/436 |
| 2004/0066760 A1* | 4/2004 | Thubert et al. .............. | 370/329 |
| 2004/0086123 A1* | 5/2004 | Neves et al. ................. | 380/270 |
| 2004/0105420 A1* | 6/2004 | Takeda et al. ............... | 370/349 |
| 2004/0133634 A1* | 7/2004 | Luke et al. .................. | 709/203 |
| 2004/0181603 A1* | 9/2004 | Rajahalme .................. | 709/230 |
| 2006/0083209 A1* | 4/2006 | Saint-Hilaire et al. ....... | 370/338 |
| 2007/0025366 A1* | 2/2007 | Shahrier et al. ............. | 370/400 |

FOREIGN PATENT DOCUMENTS

| | | |
|---|---|---|
| CN | 1202971 | 12/1998 |
| JP | 2000-022708 | 1/2000 |
| JP | 2000-224233 | 8/2000 |

(Continued)

OTHER PUBLICATIONS

Route Optimization by the use of Two care-of addresses in Hierarchical Mobile IPV6, by Youn-Hee et al., Apr. 4, 2001.*

(Continued)

*Primary Examiner*—Salad Abdullahi
(74) *Attorney, Agent, or Firm*—Katten Muchin Rosenman LLP

(57) ABSTRACT

In a load balancer preserving a function of server consistency maintenance during communications even if a terminal is a mobile terminal, identifying information specific to a mobile IP terminal is extracted from an arrival packet, and a destination server to be connected is determined based on the identifying information. Also, a home agent or a terminal is requested to notify a change of the care-of address when the care-of address of the terminal has changed, and a destination server to be connected is determined by regarding the notified care-of address as identifying information.

10 Claims, 12 Drawing Sheets

FOREIGN PATENT DOCUMENTS

| | | |
|---|---|---|
| JP | 2000-276425 | 10/2000 |
| JP | 2003-204350 | 7/2003 |
| JP | 2003521166 | 7/2003 |
| WO | WO 97/29423 | 8/1997 |
| WO | 01/56245 | 8/2001 |

OTHER PUBLICATIONS

Chinese Office Action dated Dec. 10, 2004.

Notification of Reason(s) for Refusal dated Jul. 3, 2007, for corresponding Japanese Application No. 2002-227833.

Notification of Reason(s) for Refusal dated Feb. 3, 2009, for corresponding Japanese Application No. 2002-227833.

Wada, et al., "Migration transparent communication method based on packets forwarding", IEICE Technical Report SSE92-67, Sep. 18, 1992, pp. (85-90), vol. 92, No. 218, Information Systems Laboratory, Matsushita Electric Industrial Co., Ltd., Osaka, Japan.

Masaaki Yoneda, "Abruptly increasing mobile phones threaten EC Sites, unseen load balancing "rudiment", SSL accomodating terminal as cause of worry", Nikkei Communications No. 336, Feb. 19, 2001, pp. 97-99, Japan.

* cited by examiner

FIG.5

| <RETRIEVAL KEY> | <STORED DATA> |
|---|---|
| HOME ADDRESS | CONNECTING DESTINATION SERVER ADDRESS |
| 2000.16 | S1 |
|  |  |
|  |  |

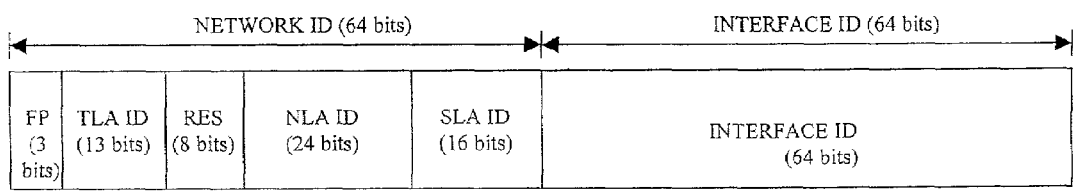

| NETWORK ID (64 bits) | | | | INTERFACE ID (64 bits) |
|---|---|---|---|---|
| FP (3 bits) | TLA ID (13 bits) | RES (8 bits) | NLA ID (24 bits) / SLA ID (16 bits) | INTERFACE ID (64 bits) |

FP : 001, Format Prefix (3 bit) for Aggregatable Global Unicast Addresses
TLA ID : Top-Level Aggregation Identifier
RES : Reserved for future use
NLA ID : Next-Level Aggregation Identifier
SLA ID : Site-Level Aggregation Identifier
INTERFACE ID: Interface Identifier

| <RETRIEVAL KEY> | <STORED DATA> |
|---|---|
| SA LOWER 64 BITS | CONNECTING DESTINATION SERVER ADDRESS |
| 16 | S1 |
|  |  |
|  |  |

FIG.10

<RETRIEVAL KEY>   <STORED DATA>

| SPI | CONNECTING DESTINATION SERVER ADDRESS |
|---|---|
| 218 | S1 |
|  |  |
|  |  |

~ 2

| <RETRIEVAL KEY> | <STORED DATA> | |
|---|---|---|
| SA (CoA) | CONNECTING SERVER ADDRESS | LIFETIME |
| 2000.12 | S1 | 35 |
| 2001.12 | S1 | 2850 |
| | | |

~ 2

SERVER SELECTION KEY
- SOURCE IP ADDRESS
- SOURCE IP ADDRESS & TCP PORT NUMBER
- URL
- COOKIE VARIABLE
- SSL SESSION ID

LB : LOAD BALANCER
R1~R4 : ROUTER
S1,S2 : SERVER
CL : CLIENT

LOAD BALANCER

BACKGROUND OF THE INVENTION

1. Field of the Invention

The present invention relates to a load balancer, and in particular to a load balancer for relieving concentrations of a server load.

2. Description of the Related Art

Various forms of load balancers have been known. An example thereof is shown in FIG. 16 where a load balancer LB receives a packet transmitted from a client CL through routers R1 and R3, and selects one of servers as a destination to be connected according to a source address (SA) included in an IP header of the packet or to a combination of the source address and a TCP port number.

Also, there is a form of designating a server distribution destination on an upper application level, or a system of selecting a server according to a URL of the destination to be connected for example.

Moreover, server distributions have been made possible by identifying an SSL (Secure Sockets Layer; an encryption protocol for ensuring TCP/IP communication security on a transport layer) session ID or a Cookie variable for identifying a user where a WWW server generates character string information "Cookie variable" to be stored by both of a server and a browser.

Another significant point as to functions of such a load balancer is a function of server consistency (transaction consistency) during communications.

For example, when server loads used for online shopping are balanced, a "consistency maintenance function" is essential for maintaining a correspondence between the client and the server during a series of flows from a product selection to a purchase and a settlement thereof.

In case of a load balancer unprovided with such a consistency maintenance function, accesses are distributed to different servers during the communication, so that a series of processing of an electronic commerce can not be operated properly.

Therefore, many of the load balancers are provided with the consistency maintenance function based on IP header information.

While the client CL shown in FIG. 16 is a fixed terminal, a mobile IP technology for managing movements of terminals on an IP protocol is currently proposed by the IETF (Internet Engineering Task Force). This technology is for maintaining a communication even if an IP terminal moves, and realizes the mobile communication by acquiring a new care-of address (CoA) whenever the IP terminal moves and by registering the care-of address in a home agent (HA) or a destination terminal.

When a server is accessed from an IP terminal utilizing this technology and when a server load balancing is performed, an IP address (care-of address) of the IP terminal is changed whenever it moves, so that the source address is changed. Therefore, the function of server consistency maintenance during communications using the source address (or combined with the source address) cannot be accomplished.

This will be described referring to a schematic diagram of a packet transmission when a mobile IPv6 is utilized as shown in FIG. 1.

A packet whose source address (SA) is a care-of address CoA1 when a mobile node (hereinafter, referred to as mobile IP terminal) MN is connected to a router R1 belonging the area or a care-of address CoA2 when connected to a router R2 belonging the area by the movement is prepared and transmitted.

Assuming that the load balancer LB is provided between the router R3 and servers S1, S2 in the same way as in FIG. 16, when the load balancer LB receives such a packet and uses the source address (SA) as a retrieval (selection) key in the same way as in FIG. 16, the load balancer misidentifies an access from the same mobile IP terminal MN as an access from another mobile IP terminal, thereby changing the server S1 to S2, so that there has been a problem that the server consistency cannot be guaranteed.

SUMMARY OF THE INVENTION

It is accordingly an object of the present invention to provide a load balancer in which a function of server consistency maintenance during communications is preserved even if a terminal is a mobile IP terminal.

In order to achieve the above mentioned object, a load balancer according to the present invention comprises: means for extracting identifying information specific to a mobile IP terminal from an arrival packet; and means for determining a destination server to be connected based on the identifying information. (claim 1)

Namely, in the present invention, in order to provide a load balancing function to a mobile IP terminal, identifying information specific to a mobile IP terminal is extracted from an arrival packet. The packet is distributed to the destination server to be connected based on the extracted identifying information.

For the above-mentioned identifying information, a home address included in a destination option header added to an IP packet transmitted by the mobile IP terminal while moving may be used. (claim 2)

Namely, as shown by an example of a server-addressed packet format in case a mobile IPv6 is used (see FIG. 4), a home address is the same while a care-of address (source address) of a packet received by the load balancer is changed with the movement of the mobile IP terminal. Therefore, by using this home address for the server selection, maintenance of a server connection consistency can be achieved.

Also, for the above-mentioned identifying information, what is prescribed in predetermined lower bits of a source address of a packet utilizing a stateless address configuration method may be used. (claim 3)

Namely, there are two preparation systems (methods) of a mobile IPv6 address as follows: (1) stateless address generation system (stateless auto address configuration) where a terminal freely prepares an address to be used, and (2) stateful address generation system (stateful auto address configuration) where a terminal obtains permission when using an address. Among these, when the above-mentioned stateless system (1) is used, L2 address identifier of the mobile IP terminal itself (e.g. the number of combined MAC address in case of an Ethernet) is used for lower 64 bits (see FIG. 6) of a care-of address prepared by the mobile IP terminal.

Since the address identifier is a value specific to a mobile IP terminal, it becomes possible for the load balancer to select the server by using the lower 64 bits of the received packet or by combining the 64 bits with other information.

Moreover, for the above-mentioned identifying information, a security parameter index (SPI) of the packet if encrypted may be used. (claim 4)

There are cases in which a mobile IPv6 packet is encrypted by an IPSEC (security) for security measures of the packet itself. In such a case, in areas following the encryption area, codes can not be decoded if there is no encryption key used between both ends.

In such a case, a security parameter index (SPI: see FIG. 9) can be used to guarantee a consistency of server selection. This security parameter index (SPI) is a number agreed upon by both ends in order to indicate the relationship between the encryption algorithm and the encryption key number used by both ends, and is written in the head portion of the encryption payload.

Also, a load balancer according to the present invention may comprise: means for requesting a home agent to notify a change of a care-of address when the care-of address of a terminal has changed upon an arrival of a first packet addressed to a server; and means for determining a destination server to be connected by regarding the notified care-of address as identifying information. (claim 5)

Namely, a care-of address of a receiving packet is changed as the mobile IP terminal moves. The relationship between a care-of address and a home address is managed by a home agent. Therefore, when receiving a packet including a care-of address, the load balancer may instruct the home agent to always notify a new care-of address when the care-of address has been changed, so that even if no packet is generated during communications, the home agent notifies the changed care-of address to the load balancer when the terminal moves.

Thus, the load balancer always knows the latest care-of address, and can select the destination server using same.

In the above-mentioned case, the home agent is adapted to draw notify the changed care-of address to the load balancer upon the change thereof. However, considering that the mobile IP terminal itself knows the change of the care-of address, the mobile node itself may be requested as a substitute for a home agent to notify the change of the care-of address when the care-of address in the first arrival packet has changed, and a server connection distribution may be performed by regarding the notified care-of address as identifying information. (claim 6)

Also, when the above-mentioned extracting means extract a packet transmitted from a home link upon an arrival of the packet and the packet does not have the destination option header, the determining means may determine the destination server by regarding a source address of the packet as the identifying information. (claim 7)

Namely, when the first packet arrives and if the packet is transmitted from a home link, or transmitted from an unmoved mobile IP terminal, the source address of the packet is regarded as the identifying information to determine the destination server.

Also, the above-mentioned determining means may be provided with a table for storing an address of the destination server having a source address of a packet, i.e. the care-of address, as a retrieval key, thereby determining the destination server using the source address of the arrival packet. (claim 8)

Also, the above-mentioned determining means may be provided with a table for storing an address of the destination server having a source address of a packet, i.e. the care-of address, as a retrieval key, thereby determining the destination server using the source address of the arrival packet, and the table may prepare an entry with a new care-of address as a retrieval key when the new care-of address has been notified, and may store, as storing data, an address of the destination server stored as data of an entry of an old care-of address. (claim 9)

Also, the above-mentioned determining means may store a lifetime in the data of the entry, may periodically decrement the lifetime, may update the lifetime every time a packet using the entry has arrived, and may invalidate the entry upon expiration of the lifetime. (claim 10)

Also, a home agent of a mobile IP terminal as a substitute for the above-mentioned server may be made a destination to be connected. (claim 11)

Namely, not only a server but also a home agent of a mobile IP terminal may be made an object of a load balancing.

Moreover, a home agent may be realized which notifies, according to a request from a load balancer, binding cache information managed by the home agent itself to the load balancer periodically or when triggered in operation by a change of a care-of address of a mobile IP terminal. (claim 12).

Moreover, a mobile IP terminal may be realized which notifies, according to a request from a load balancer, binding cache information managed by the mobile IP terminal itself to the load balancer periodically or when triggered in operation by a change of a care-of address of the mobile IP terminal itself. (claim 13).

BRIEF DESCRIPTION OF THE DRAWINGS

FIG. 5 is a diagram showing an arrangement (where a home address is made a retrieval key) of a load balancing table used in an arrangement (1) of a load balancer according to the present invention;

FIG. 6 is a format diagram of a general global address of an IPv6 packet;

FIG. 10 is a diagram showing an arrangement (where an SPI is made a retrieval key) of a load balancing table used in an arrangement (1) of a load balancer according to the present invention;

Throughout the figures, like reference numerals indicate like or corresponding components.

DESCRIPTION OF THE EMBODIMENTS

Network Embodiment (1)

Figure 1:
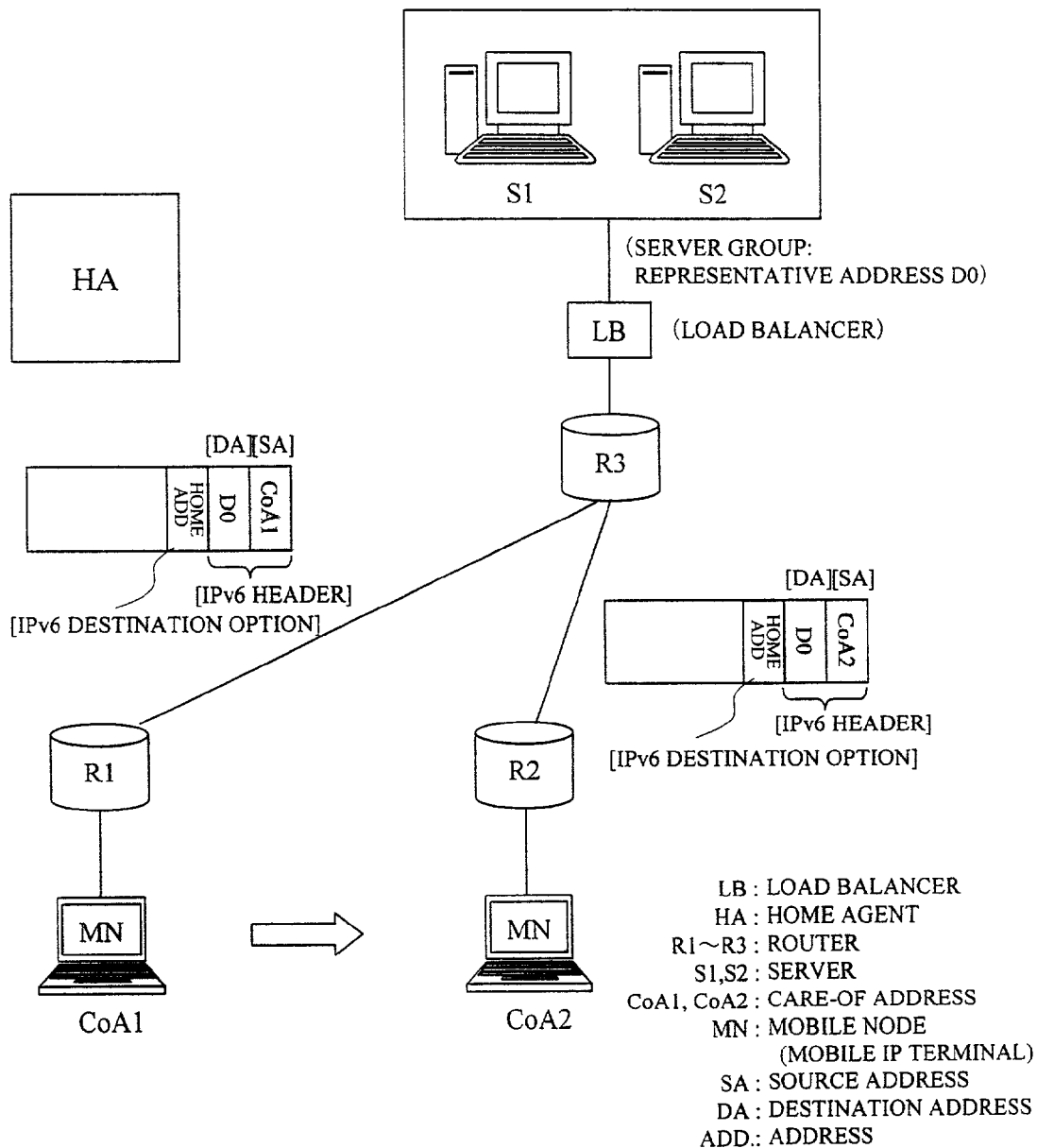
FIG. 1 is a diagram showing a network embodiment (1) to which a load balancer according to the present invention is applied.

FIG. 1 shows a network embodiment (1) to which a load balancer according to the present invention is applied. In this embodiment, when a mobile IP terminal MN moves from a router R1 belonging the area to a router R2 belonging the area and when its care-of address is changed from CoA1 to CoA2, identifying information (retrieval key) specific to the mobile IP terminal MN is extracted, so that if a server S1 has been selected the server S1 is selected similarly during communications, thereby retaining the function of server consistency maintenance.

Figure 2:
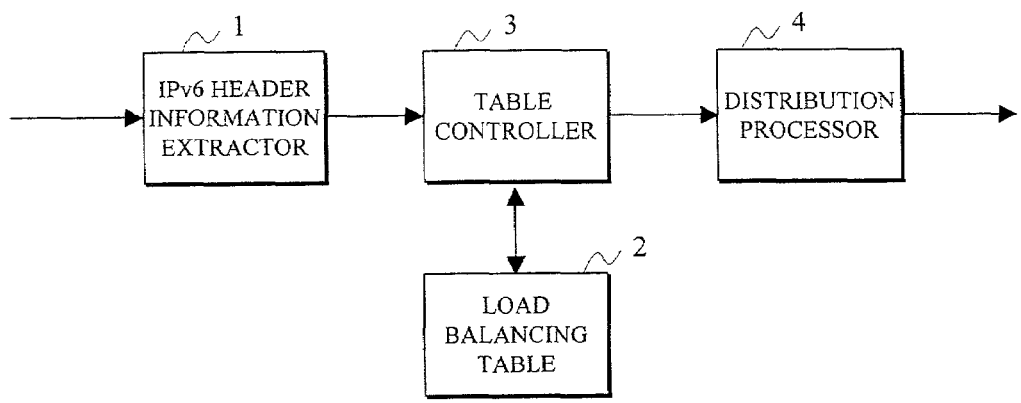
FIG. 2 is a block diagram showing an arrangement (1) of a load balancer according to the present invention.

FIG. 2 shows an arrangement (1) of the load balancer LB shown in FIG. 1. In this arrangement, the load balancer LB is composed of an IPv6 header information extractor 1, a load balancing table 2, a table controller 3, and a distribution processor 4.

The IPv6 header information extractor 1 extracts identifying information, so that the table controller 3 looks up the load balancing table 2 regarding the identifying information as a retrieval key. The distribution processor 4 determines a destination server to be distributed based on the server information thus obtained.

It is to be noted that the load balancing table 2, the table controller 3, and the distribution processor 4 form the determining means.

Figure 3:
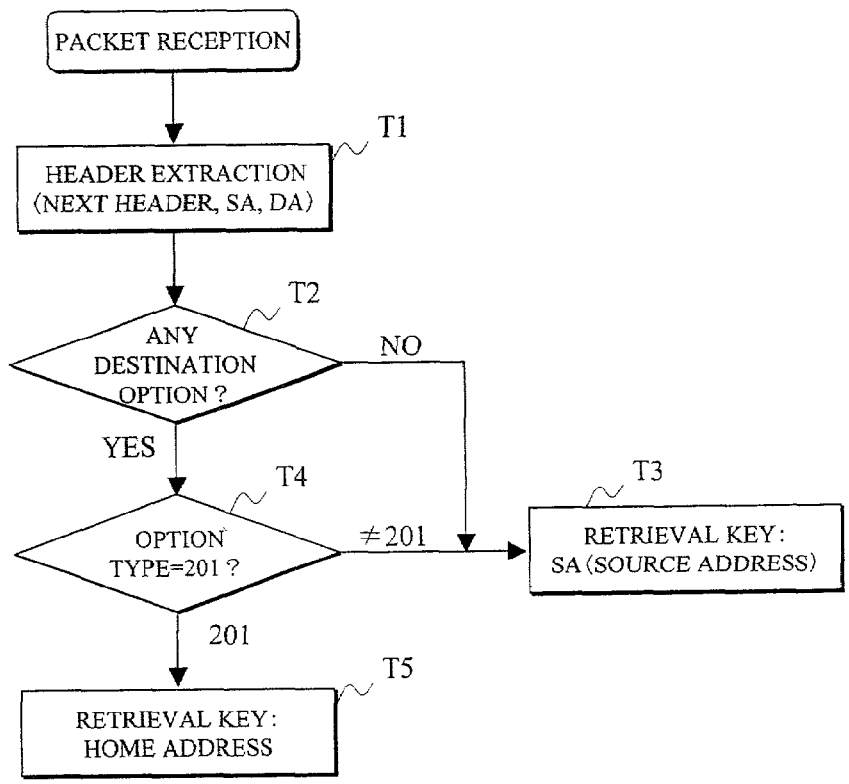
FIG. 3 is a flow chart showing an operation example (where a home address is made a retrieval key) of an IPv6 header information extractor used in an arrangement (1) of a load balancer according to the present invention.

(1) In Case Home Address is Used as Retrieval Key:

FIG. 3 shows an operation example of the IPv6 header information extractor 1 in case a home address is used as the above-mentioned retrieval key (identifying information) to select a server based thereon.

Figure 4:
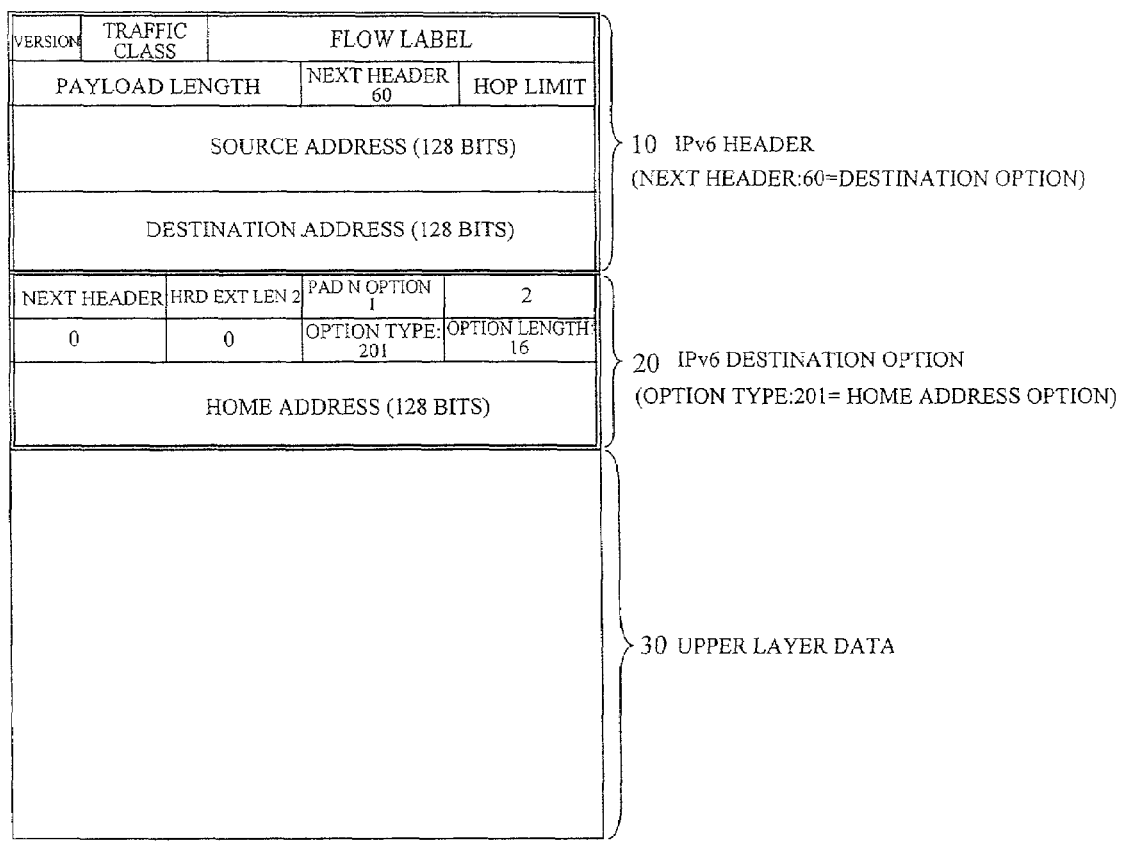
FIG. 4 is a format diagram showing a mobile IPv6 packet (from terminal to server) used in an arrangement (1) of a load balancer according to the present invention.

Namely, a header extraction is firstly executed (at step T1), where a "Next header" field is checked sequentially from an IPv6 header 10 of a mobile IPv6 packet (from terminal to server) shown in FIG. 4 until a code "60" indicating an IPv6 destination option is found (at step T2).

When the destination option code "60" is not found, it is determined that the mobile IP terminal MN has not moved but been connected to a home link, so that the table controller 3 retrieves a destination server to be connected from the table 2 using a source address (SA) as the retrieval key, as later described. The distribution processor 4 transmits the packet to the server (at step T3).

On the other hand, when the destination option code "60" is found, it is indicated that a destination option header 20 exists in the field following the IPv6 header.

Subsequently, it is determined whether or not an option type included in the destination option header 20 is "201" (at step T4). If the option type is not "201", the routine proceeds to the above-mentioned step T3. If the option type is "201", this option type indicates a home address option, namely, the mobile IP terminal MN has moved. Therefore, the distribution processor 4 selects a corresponding server from a server group using the home address as the retrieval key (at step T5).

FIG. 5 shows a table arrangement of the load balancing table 2 shown in FIG. 2. In this table, with a home address "2000.16" being made a retrieval key, this home address and a destination server address "S1" associated therewith one-to-one are stored.

The destination server address is the address of the server determined according to a load balancing algorithm at an initiation of communications. There are various methods or algorithms for selecting the destination server such as a method selecting a server by a round robin, and a method selecting one with less server loads. These conventional methods can be used unchanged.

It is to be noted that the home address in FIG. 5 is shown having a format where "2000" corresponds to a network ID (64 bits) of a global address format of a mobile IPv6 packet shown in FIG. 6, and "16" corresponds to an interface ID (64 bits). Hereinafter, the address indication format of the retrieval key is the same.

Also, the retrieval table of the destination server address making the source address (SA) a retrieval key at step T3 of FIG. 3, is similarly stored in the above-mentioned load balancing table 2 (reference numerals are also the same). This table example is the same as that of FIG. 5 except that the source address SA in substitute for the home address is written in the field of the retrieval key.

(2) In Case Lower 64 Bits of SA Address are Used as Retrieval Key:

Apart from the case where the home address is made the retrieval key as mentioned above, when the packet is prepared by the stateless address generation system, it is also possible to make the lower 64 bits of the global address of the mobile IPv6 shown in FIG. 6 a retrieval key. It is to be noted that the arrangement (1) of FIG. 2 can be used as the arrangement of the load balancer LB in this case.

Namely, in case of the stateless address generation system described above, the lower 64 bits of the global address of the mobile IPv6 packet use an L2 address identifier such as a number obtained by combining therewith e.g. the MAC address of the terminal itself as for an Ethernet.

Therefore, since the address is unique to each terminal, the lower 64 bits of the global address may be extracted instead of searching for the home address.

Figures 7, 8:
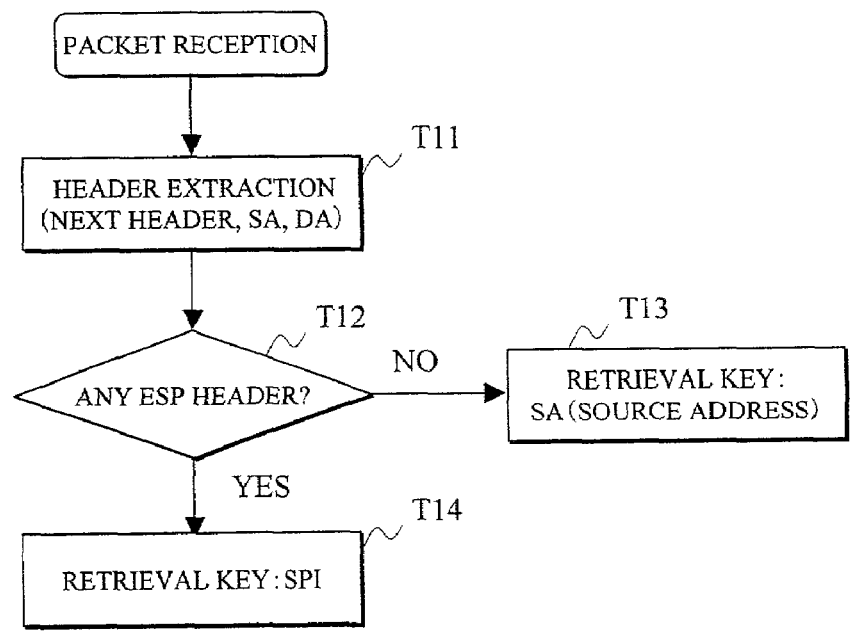
FIG. 7 is a diagram showing an arrangement (where lower 64 bits of a source address is made a retrieval key) of a load balancing table used in an arrangement (1) of a load balancer according to the present invention.
FIG. 8 is a flow chart showing an operation example (where an SPI is made a retrieval key) of an IPv6 header information extractor used in an arrangement (1) of a load balancer according to the present invention.

Also, the arrangement of the load balancing table 2 in this case is shown in FIG. 7. If the lower 64 bits of the source address (SA) are "16", it is indicated that the destination server address is "S1", so that the distribution processor 4 distributes the connecting destination of the server based on the retrieval result.

(3) In Case SPI is Used as Retrieval Key:

Apart from using the home address or the lower 64 bits of the source address as mentioned above, the load balancing can be performed using a security parameter index (SPI) when the mobile IPv6 packet is encrypted. It is to be noted that the arrangement (1) of FIG. 2 can also be used for the arrangement of the load balancer LB in this case.

Figure 9:
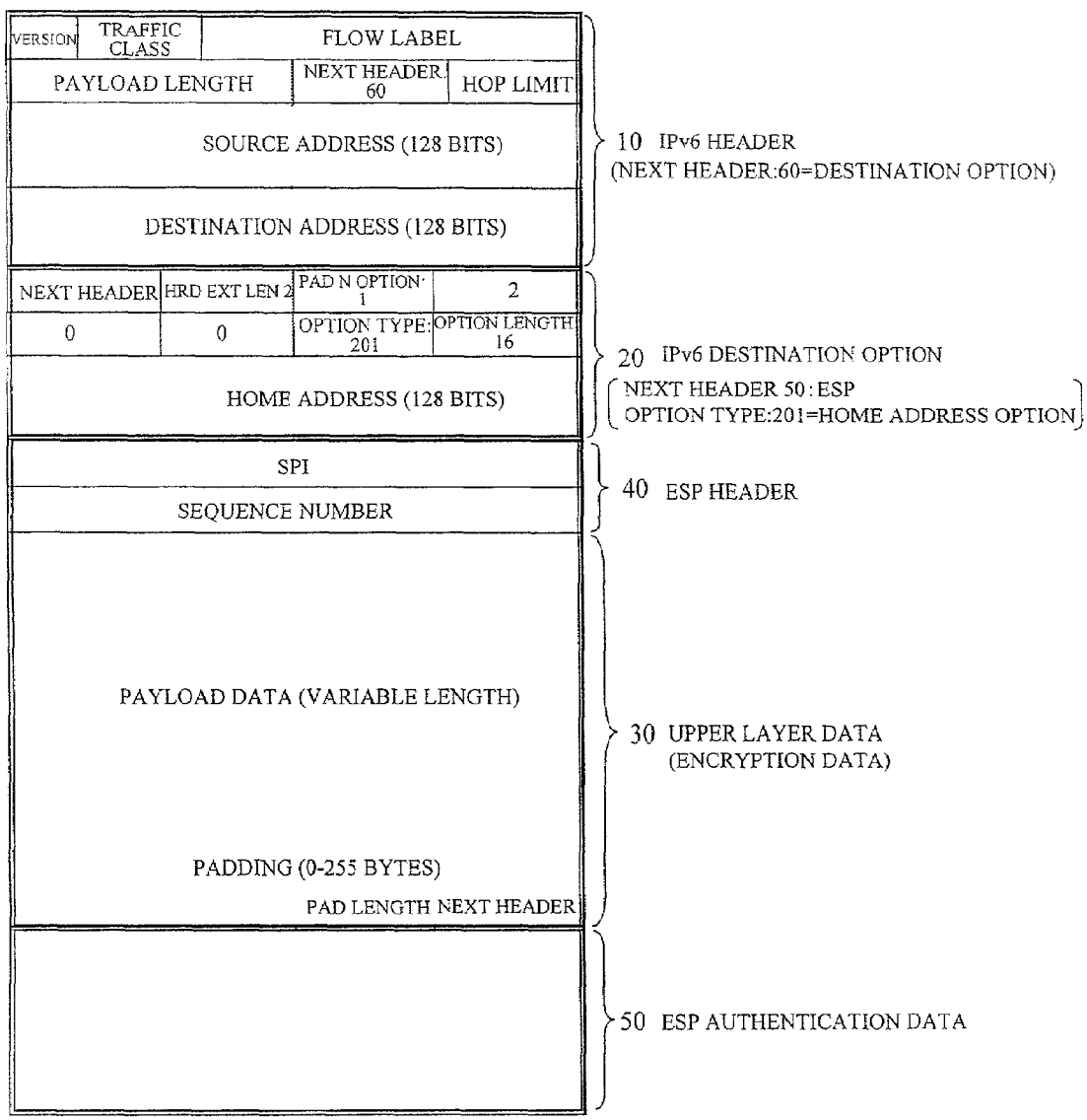
FIG. 9 is a format diagram showing an IPSEC-encrypted mobile IPv6 packet (from terminal to server) used in an arrangement (1) of a load balancer according to the present invention.

An operation example of the IPv6 header information extractor 1 in this case is shown in FIG. 8. Firstly, the IPv6 header information extractor 1 performs the header extraction as mentioned-above (at step T11). In this case, as shown in the IPSEC-encrypted format of the mobile IPv6 packet (from terminal to server) of FIG. 9, the "next header" field is checked sequentially from the IPv6 header 10 until a code "50" indicating an encryption header (ESP header) 40 is found (at step T12).

If the code "50" is not found, the server is selected based on the source address (SA) (at step T13), and otherwise the next option header is the ESP header 40.

At the top of the ESP header 40, the security parameter index SPI is written, so that the index SPI thus acquired is made the retrieval key of the table to be looked up next (at step T14).

FIG. 10 shows an arrangement of the load balancing table 2 when the index SPI is thus made the retrieval key. In this example, the destination server address "S1" associated one-to-one with the index SPI "218" is stored. The destination server address "S1" is the address of the server determined by the load distribution algorithm at the initiation of the communication as mentioned above.

Network Embodiment (2)

Figure 11:
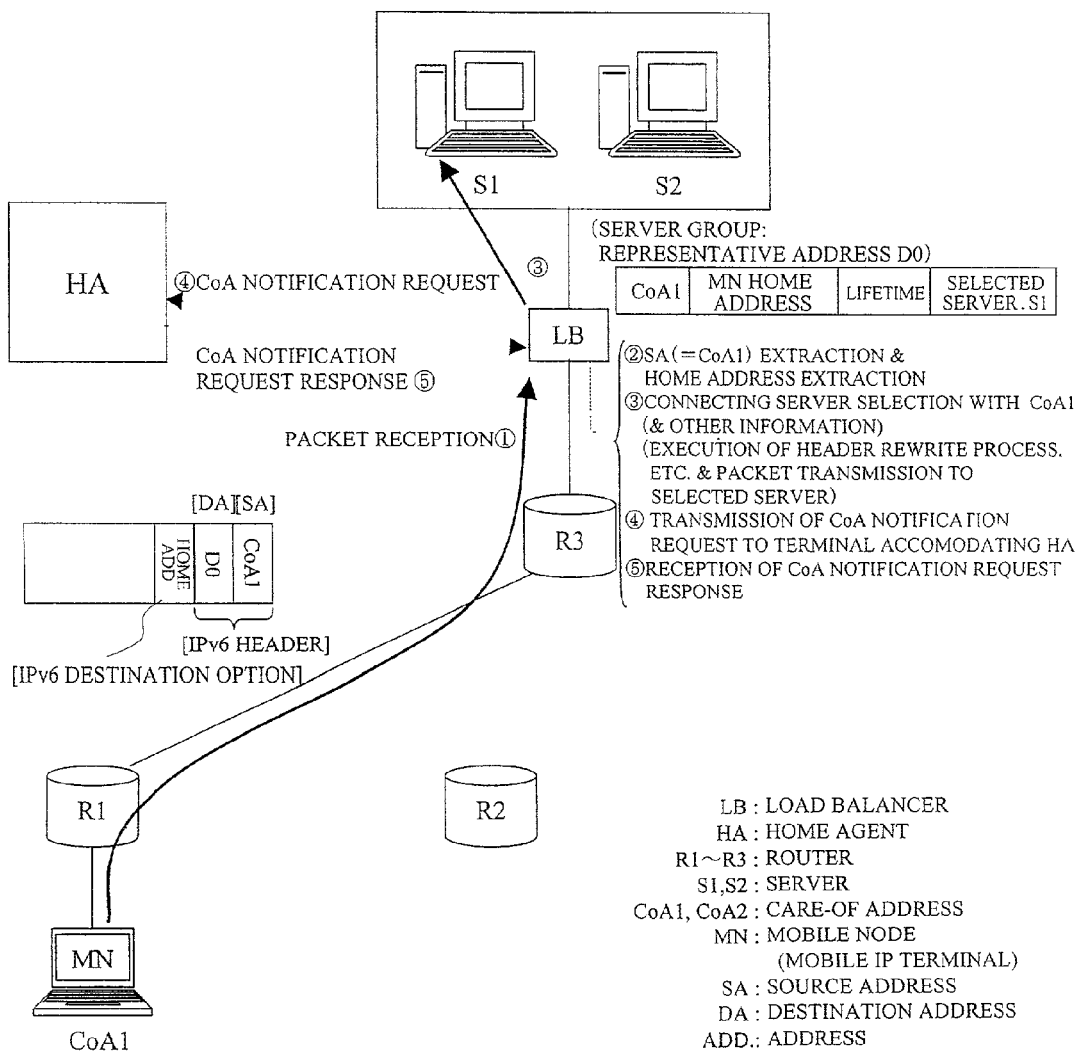
FIG. 11 is a diagram showing a network embodiment (2) (when a first packet is received) to which a load balancer according to the present invention is applied.
Figure 12:
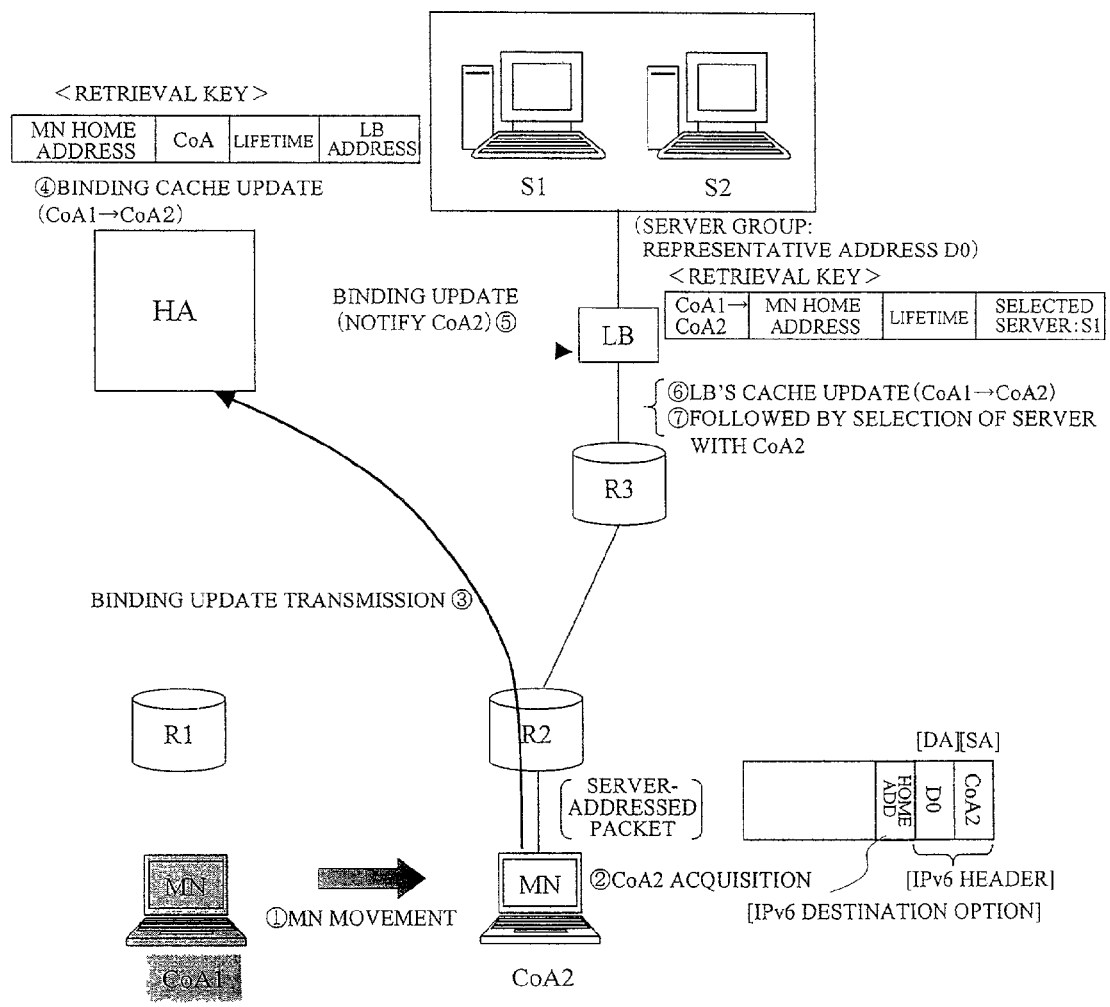
FIG. 12 is a diagram showing a network embodiment (2) (when a mobile IP terminal moves) to which a load balancer according to the present invention is applied.

FIGS. 11 and 12 show a network embodiment (2) to which a load balancer according to the present invention is applied. This embodiment is a system where information is exchanged between the home agent HA and the load balancer LB so that the retrieval key is changed with the movement of the mobile IP terminal MN.

Hereinafter, an overall operation of this embodiment will be described referring to FIGS. 11 and 12.

Firstly, the operation example when the load balancer LB receives the first packet from the mobile IP terminal MN as shown in FIG. 11 will be described.

① The mobile IPv6 packet from the mobile IP terminal MN at a care-of address CoA1 is received by the load balancer LB through routers R1 and R3.

② The load balancer LB extracts the source address (SA=CoA1) of the mobile IP terminal MN as well as the home address of the terminal MN.

③ According to the extracted care-of address CoA1 (and other information), e.g. a server S1 is selected as the destination server. At the same time, a header rewrite process, etc. are executed, and the packet is transmitted to the selected server S1.

④ With the above-mentioned ③, the load balancer LB transmits a care-of address notification request, for having the fact of the care-of address change notified when the care-of address is changed, from a CoA notification request generator 5 to the home agent HA accommodating the mobile IP terminal MN.

⑤ The home agent HA returns a response to the care-of address notification request.

An operation example when the mobile IP terminal MN further moves as shown in FIG. 12 will be described.

① The mobile IP terminal MN moves from the router R1 belonging the area of the care-of address CoA1 to the router R2 belonging the area of the care-of address CoA2.

② The mobile IP terminal MN acquires the care-of address CoA2.

③ The mobile IP terminal MN transmits a binding update indicating that the care-of address has been changed from CoA1 to CoA2 to the home agent HA.

④ The home agent HA having received the binding update updates the care-of address in the binding cache of the home agent HA itself from CoA1 to CoA2.

⑤ The home agent HA notifies the binding update of the care-of address CoA2 to the load balancer LB.

⑥ The load balancer LB updates the care-of address from CoA1 to CoA2 in its internal cache in the same way as the home agent HA.

⑦ The load balancer LB then selects the server S1 based on the care-of address CoA2 in the same way as the care-of address CoA1.

Figure 13:
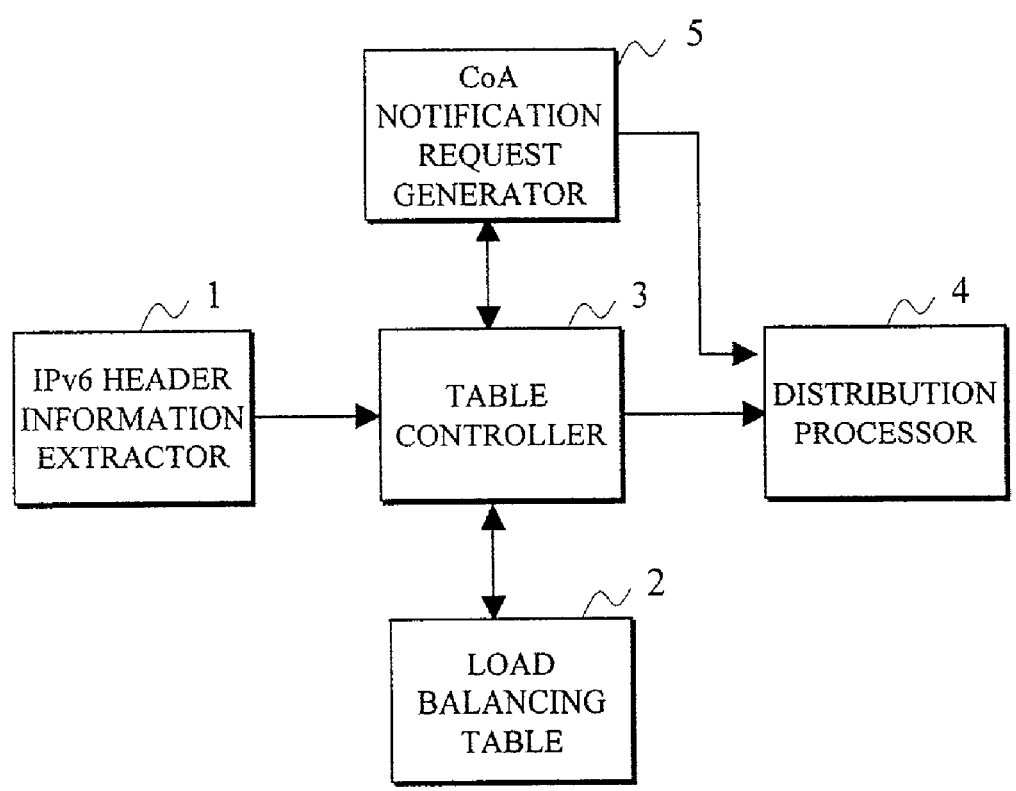
FIG. 13 is a block diagram showing an arrangement (2) of a load balancer according to the present invention.

An arrangement (2) of the load balancer LB executing such an operation is shown in FIG. 13 which differs from that shown in FIG. 2 in that the CoA notification request generator 5 has been added.

Figure 14A:
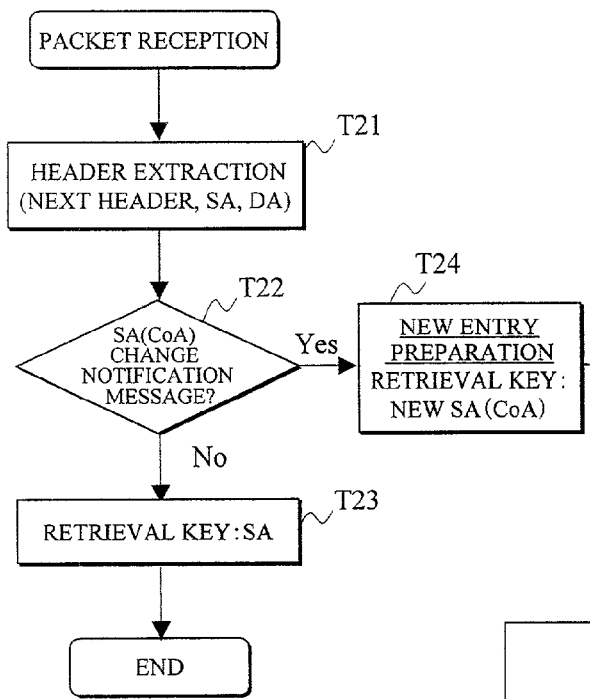
FIGS. 14A and 14B are flow charts showing an operation example (where a source address is made a retrieval key) of an IPv6 header information extractor used in an arrangement (2) of a load balancer according to the present invention.

Hereinafter, an operation example of the IPv6 header information extractor 1 shown in FIGS. 14A and 14B in the arrangement (2) of the load balancer LB will be described with some portions being overlapped with the above-mentioned description.

Firstly, the IPv6 header information extractor 1 extracts the header of the received packet as described above (at step T21 of FIG. 14A). Usually, since the source address (SA) as the care-of address is used as the retrieval key, whether or not the received packet is a notification message ⑤ shown in FIG. 12 indicating the change of the source address (SA) is determined (at step T22).

Figures 15, 16:
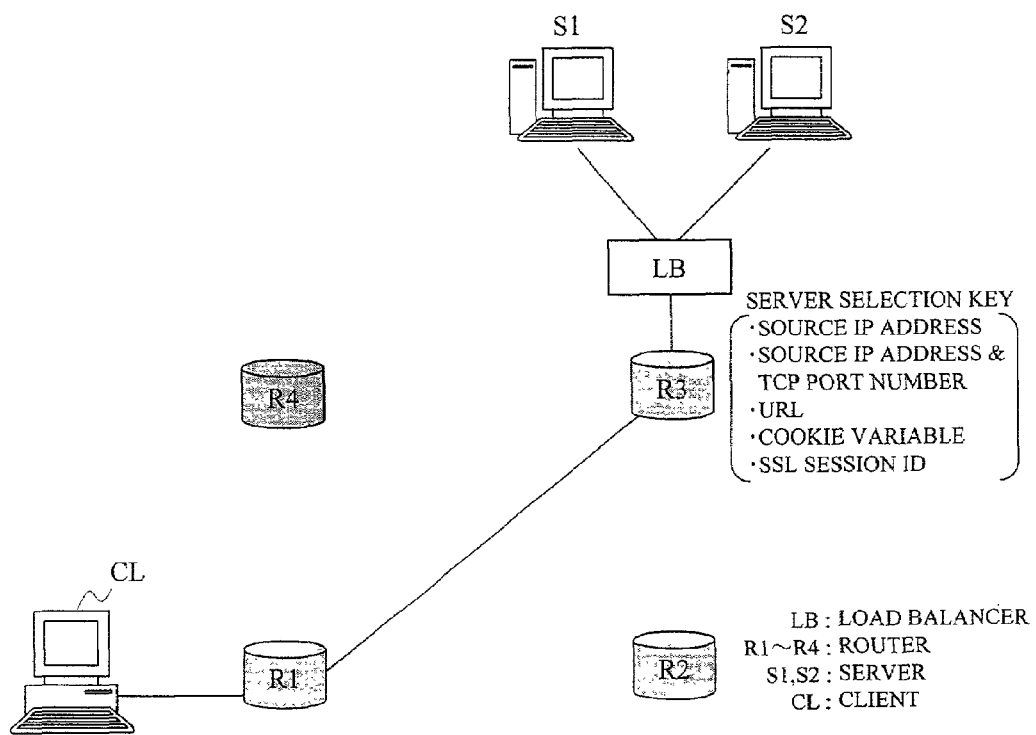
FIG. 15 is a diagram showing an arrangement (where a source address is made a retrieval key) of a load balancing table used in an arrangement (2) of a load balancer according to the present invention.
FIG. 16 is a diagram showing a network arrangement to which a prior art load balancer is applied.

As a result, if it is not the message in which the source address (SA) is changed, the source address (SA) is made the retrieval key to select the destination server from the load balancing table 2 shown in FIG. 15 (at step T23).

In this example, since the source address (SA) is "2000.12", the server with the destination server address of "S1" is selected.

On the other hand, when it is found to be the change notification message of the source address (SA) at step T22, a new entry preparation is executed (at step T24).

Figure 14B:
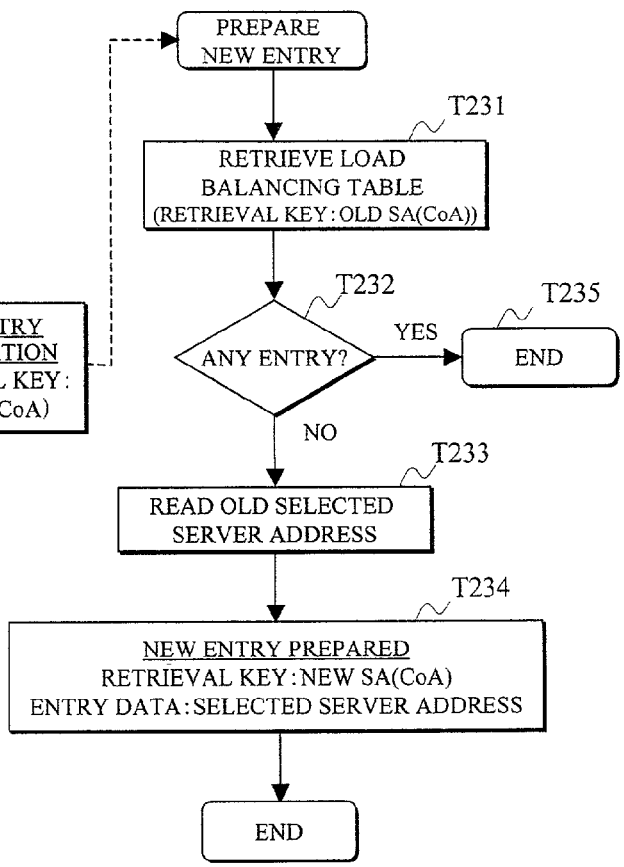

In this case, a flow chart of FIG. 14B is executed, so that the load balancing table 2 shown in FIG. 15 is firstly looked up (at step T231) to determine whether or not an entry already exists (at step T232).

As a result, if the entry is not prepared, namely, if the retrieval where an old care-of address (=CoA1) included in the notification message ⑤ is made the retrieval key results in a mishit, an entry is newly prepared.

At this time, the retrieval key to be registered is the new care-of address. However, as the contents of the prepared entry, the table 2 is looked up again with the old care-of address included in the notification message ⑤ as the retrieval key and the resulting old server address obtained is stored as the data of the entry whose retrieval key is the new care-of address as shown in FIG. 15 (at steps T233 and T234). This is for selecting the same server even if the same mobile IP terminal moves.

Thus, the server address used in connection with the old care-of address is copied to the entry of the new care-of address, so that it is made possible to connect to the same server even if the mobile IP terminal moves.

It is to be noted that in the table 2 of FIG. 15, a lifetime is shown. This lifetime indicates the lifetime of the entry, to which a subtraction is processed every fixed period of time to delete the entry when it assumes "0" as a timeout.

Therefore, the source addresses (SA's) coexist for a fixed lifetime for the same server address, so that it is not required to prepare a new entry when the mobile IP terminal MN again returns to the care-of address CoA1 (at step T235).

It is to be noted that in the embodiment (2) shown in FIGS. 11 and 12, the load balancer LB performs the change notification request of the care-of address to the home agent HA.

However, since the IP terminal itself originally knows the change of the care-of address, when the load balancer LB requests this IP terminal address to notify upon change of the care-of address in the same way, the same operation as mentioned above is performed.

As described above, a load balancer according to the present invention is arranged such that identifying information specific to a mobile IP terminal is extracted from an arrival packet, and a destination server to be connected is determined based on the identifying information. Therefore, at the time of a server access from the mobile IP terminal, a server connection consistency is always maintained.

Also, by requesting a home agent or a terminal to notify a change of a care-of address when the care-of address of the terminal has changed and by determining a destination server to be connected by regarding the notified care-of address as identifying information, the server connection consistency can be similarly maintained.

What we claim is:

1. A load balancer comprising:
    extracting means identifying information specific to a mobile IP terminal from an arrival packet having a destination designated to a plurality of servers with a representative address; and
    determining means determining a single destination server, from among the plurality of servers corresponding to the=destination of the packet, to be connected based on the identifying information, and rewriting the destination of the packet to be changed into the destination server from the plurality of servers, and to be transmitted to the destination server, wherein
        the destination server is associated with the mobile IP terminal according to a load balancing algorithm,
        the mobile IP terminal can communicate with the single destination server before and after the mobile IP terminal moves from one network to another network, and
        the identifying information is prescribed in predetermined lower bits of a source address of a packet utilizing a stateless address configuration method.

2. The load balancer as claimed in claim 1, wherein when the extracting means extract a packet transmitted from a home link upon an arrival of the packet and the packet does not have the destination option header, the determining means determine the destination server by regarding a source address of the packet as the identifying information.

3. The load balancer as claimed in claim 2, wherein the determining means are provided with a table for storing an address of the destination server having a source address associated with the care-of address as a retrieval key, thereby determining the destination server using the source address of the arrival packet.

4. The load balancer as claimed in claim 1, wherein the determining means are provided with a table for storing an address of the destination server having a source address associated with the care-of address as a retrieval key, thereby determining the destination server using the source address of the arrival packet.

5. The load balancer as claimed in claim 1, wherein a home agent of a mobile IP terminal as a substitute for the server is made a destination to be connected.

6. A load balancer comprising:
    extracting means identifying information specific to a mobile IP terminal from an arrival packet having a destination designated to a plurality of servers with a representative address; and
    determining means determining a single destination server, from among the plurality of servers corresponding to the=destination of the packet, to be connected based on the identifying information, and rewriting the destination of the packet to be changed into the destination server from the plurality of servers, and to be transmitted to the destination server, wherein
        the destination server is associated with the mobile IP terminal according to a load balancing algorithm,
        the mobile IP terminal can communicate with the single destination server before and after the mobile IP terminal moves from one network to another network, and
        the identifying information comprises a security parameter index of the packet if encrypted.

7. A load balancer comprising:
    extracting means extracting identifying information specific to a mobile IP terminal from an arrival packet having a destination designated to a plurality of servers with a representative address;
    requesting means requesting a home agent to notify a change of a care-of address to the load balancer itself when the care-of address of the mobile IP terminal has changed in the arrival packet; and
    determining means determining a single destination server, from among the plurality of servers corresponding to the destination of the packet, to be connected by regarding the notified care-of address as the identifying information, and rewriting the destination of the packet to be changed into the destination server from the plurality of servers, and to be transmitted to the destination server, wherein the determining means are provided with a table for storing an address of the destination server having a source address associated with the care-of address as a retrieval key, thereby determining the destination server using the source address of the arrival packet, and the table prepares an entry with a new care-of address as a retrieval key when the new care-of address has been notified, and stores, as storing data, an address of the destination server stored as data of an entry of an old care-of address, and wherein
        the destination server is associated with the mobile IP terminal according to a load balancing algorithm, and
        the mobile IP terminal can communicate with the single destination server before and after the mobile IP terminal moves from one network to another network.

8. The load balancer as claimed in claim 7, wherein the determining means store a lifetime in the data of the entry, periodically decrement the lifetime, update the lifetime every time a packet using the entry has arrived, and invalidate the entry upon expiration of the lifetime.

9. A load balancer comprising:
    extracting means extracting identifying information specific to a mobile IP terminal from an arrival packet having a destination designated to a plurality of servers with a representative address;
    requesting means requesting a terminal to notify a change of a care-of address to the load balancer itself when the care-of address of the terminal has changed in the arrival packet; and
    determining means determining a single destination server, from among the plurality of servers corresponding to the destination of the packet, to be connected by regarding the notified care-of address as the identifying information, and rewriting the destination of the packet to be changed into the destination server from the plurality of servers, and to be transmitted to the destination server, wherein the determining means are provided with a table for storing an address of the destination server having a source address associated with the care-of address as a retrieval key, thereby determining the destination server using the source address of the arrival packet, and the table prepares an entry with a new care-of address as a retrieval key when the new care-of address has been notified, and stores, as storing data, an address of the destination server stored as data of an entry of an old care-of address, and wherein the destination server is associated with the mobile IP terminal according to a load balancing algorithm, and the mobile IP terminal can communicate with the single destination server before and after the mobile IP terminal moves from one network to another network.

10. The load balancer as claimed in claim 9, wherein the determining means store a lifetime in the data of the entry, periodically decrement the lifetime, update the lifetime every time a packet using the entry has arrived, and invalidate the entry upon expiration of the lifetime.

* * * * *